United States Patent [19]

Gambill

[11] Patent Number: 5,118,001
[45] Date of Patent: Jun. 2, 1992

[54] ENCLOSURE FOR ELECTRICAL EQUIPMENT CONTROLS

[76] Inventor: Terry A. Gambill, 2169 Evergreen, Perry, Ohio 44081

[21] Appl. No.: 467,984

[22] Filed: Jan. 22, 1990

[51] Int. Cl.$^5$ .............................................. B65D 53/00
[52] U.S. Cl. .................................... 220/344; 220/377; 220/476
[58] Field of Search ............... 220/344, 377, 476, 477; 49/485, 402, 401, 504, 394; 361/356, 364, 369

[56] References Cited

U.S. PATENT DOCUMENTS

| | | | |
|---|---|---|---|
| 3,067,822 | 12/1962 | Hattenhauer | 220/477 X |
| 3,088,627 | 5/1963 | Saunders | 220/344 X |
| 4,343,504 | 8/1982 | Tomioka et al. | 49/485 X |
| 4,469,238 | 9/1984 | Ranalli | 220/254 |
| 4,522,311 | 6/1985 | Ikeda | 220/254 |
| 4,869,022 | 9/1989 | Laurent | 49/394 |
| 4,890,318 | 12/1989 | Crane et al. | 361/356 X |
| 4,927,208 | 5/1990 | Farmont | 49/485 X |

Primary Examiner—Stephen Marcus
Assistant Examiner—Paul A. Schwarz
Attorney, Agent, or Firm—Oldham, Oldham & Wilson Co.

[57] ABSTRACT

An access window enclosure which is mounted on the surface of a control equipment enclosure to protect indicators and controls located on the equipment enclosure surface. The access window enclosure is hinged and latched to allow easy access to the indicators and controls located beneath it. The front of the access window enclosure contains a transparent panel which keeps the indicators and controls in view when the access window enclosure is closed. The mounting frame of the access window enclosure uses a compliant gasket to seal against the transparent panel.

10 Claims, 2 Drawing Sheets (1)

ENCLOSURE FOR ELECTRICAL EQUIPMENT CONTROLS

FIELD OF INVENTION

This invention relates to an enclosure used to protect electrical equipment and controls from corrosion, windblown dust and rain, splashing water, hose-directed water and dripping noncorrosive liquids.

BACKGROUND OF THE INVENTION

Controls, indicating meters, chart recorders and other types of electrical equipment controls are typically installed on the surface of control equipment enclosures. Control equipment enclosures enable switches and meters to be arranged in an orderly and safe fashion on the exterior surface of the enclosure. Since these controls are on the surface of the control equipment enclosure, they are exposed to the environment where the control equipment enclosure is located. These controls can be damaged by water leaks, rain, or dirt. The controls can be inadvertently operated or broken when bumped.

One means used to protect electrical equipment controls is locating the controls and indicators inside the equipment enclosure. This places the indicators out of view and requires the equipment enclosure be opened to view the indicators or operate the controls. This has not been a satisfactory solution for frequently accessed indicators and controls.

Another means to protect electrical equipment controls and indicators is mounting viewing windows on the surface of the equipment enclosure over selected controls and indicators. These viewing windows are typically hinged to allow access to the controls within the viewing window. These viewing windows provide protection from physical damage and inadvertent operation from bumping and protection from dust, falling dirt and dripping noncorrosive liquids. However, these viewing windows have not protected the enclosed indicators and controls from corrosion, windblown dust and rain, splashing water and hose-directed water.

Existing viewing windows can meet the requirements of the National Electrical Manufacturers Association (NEMA) standards for Enclosures for Electrical Equipment (1000 Volts Maximum) Publication No. 250 for Type 12 enclosures. This provides indoor protection from dust, falling dirt and dripping noncorrosive liquids. These viewing windows have not met the requirements for Type 4 and Type 4X enclosures which provide indoor and outdoor protection from corrosion, wind blown dust and rain, splashing water and hose-directed water.

SUMMARY OF THE INVENTION

The present invention is an access window enclosure which is mounted on the surface of a control equipment enclosure to protect indicators and controls located on the equipment enclosure surface. The access window enclosure is hinged and latched to allow easy access to the indicators and controls located beneath it. The front of the access window enclosure contains a glass panel which keeps the indicators and controls in view when the access window enclosure is closed.

The mounting frame of the access window enclosure uses a compliant gasket to seal against the glass panel. Conventional viewing windows mount the glass panel to the hinged frame and seal the hinged frame to the mounting frame.

DETAILED DESCRIPTION OF THE INVENTION

Figure 1:
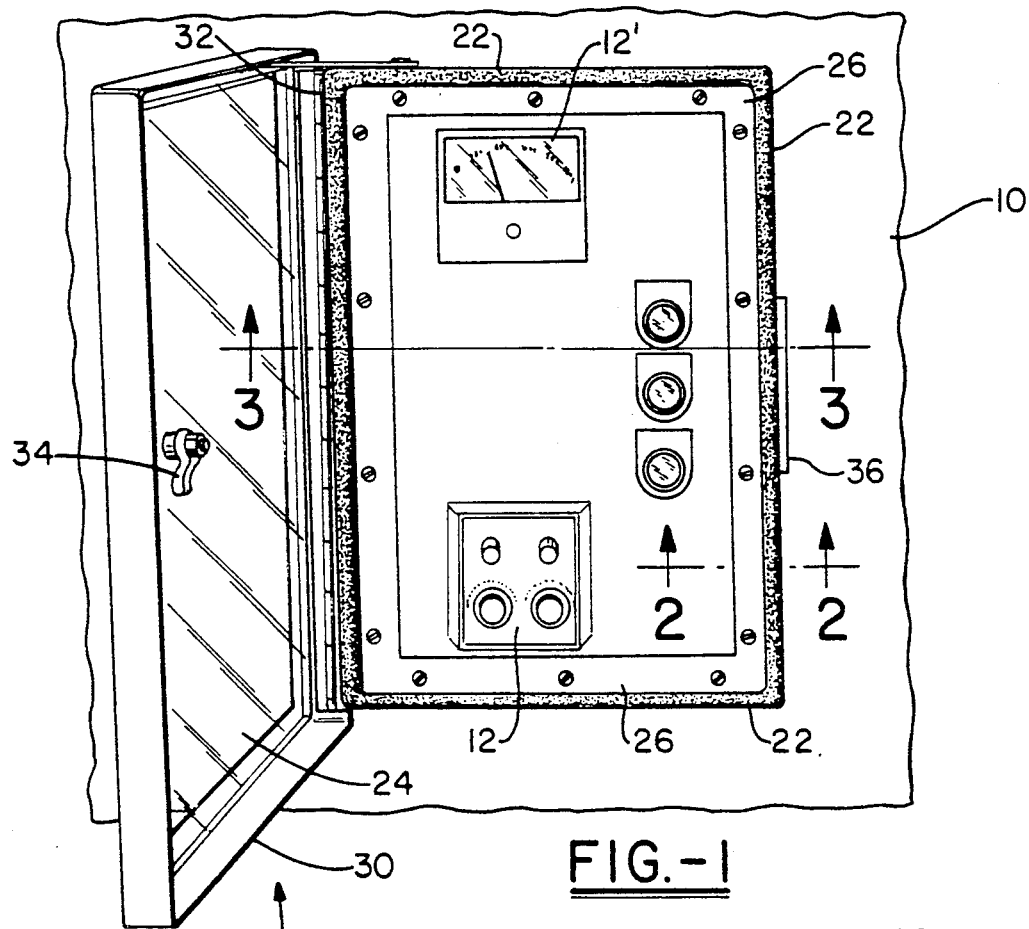
FIG. 1 is a front view of the access window enclosure mounted on a typical control equipment enclosure.

The preferred embodiment of the present invention is an access window enclosure 20 which is mounted on the front panel surface of a control equipment enclosure 10 as shown in FIG. 1. The access window enclosure 20 is located over the controls 12 and indicators 12' which are to be protected. The access window enclosure 20 of the present invention has been tested and certified to meet or exceed the NEMA standards for Type 4, type 4X and Type 12 electrical equipment enclosures. Conventional viewing windows meet the requirements for the Type 12 enclosures but not the more severe requirements for Type 4 and Type 4X enclosures.

The access window enclosure 20 consists of a hinged viewing door 30 attached to a rectangular mounting frame 26. The mounting frame 26 is attached to the control equipment enclosure 10 using conventional fasteners such as screws and nuts. The mounting frame 26 and the peripheral portion of the viewing door 30 are manufactured using polyester powder coated metal. The center of the door 30 contains a glass panel 24 which permits viewing of the controls 12 and indicators 12' located within the access window enclosure 20. The glass panel 24 is typically a shatter resistant glass such as ¼ inch automotive type safety glass.

Figure 2:
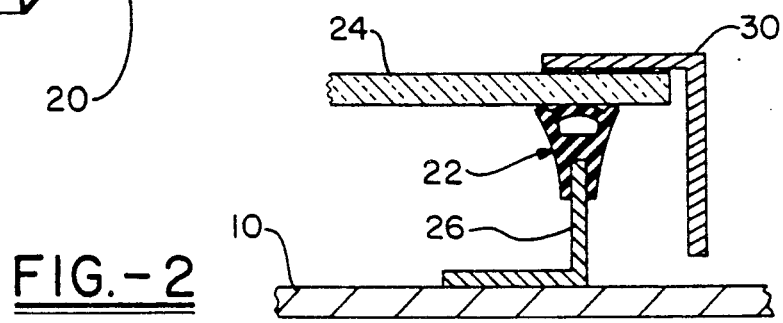
FIG. 2 is a cross-sectional view taken on line 2—2 of FIG. 1 showing the details of the sealing gasket with the access window enclosure closed.
Figure 3:
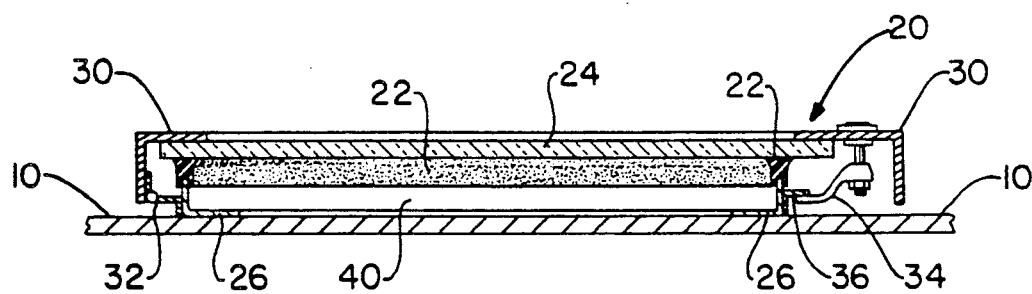
FIG. 3 is a cross-sectional view taken on line 3—3 of FIG. 1 with the access window enclosure closed.
Figure 4:
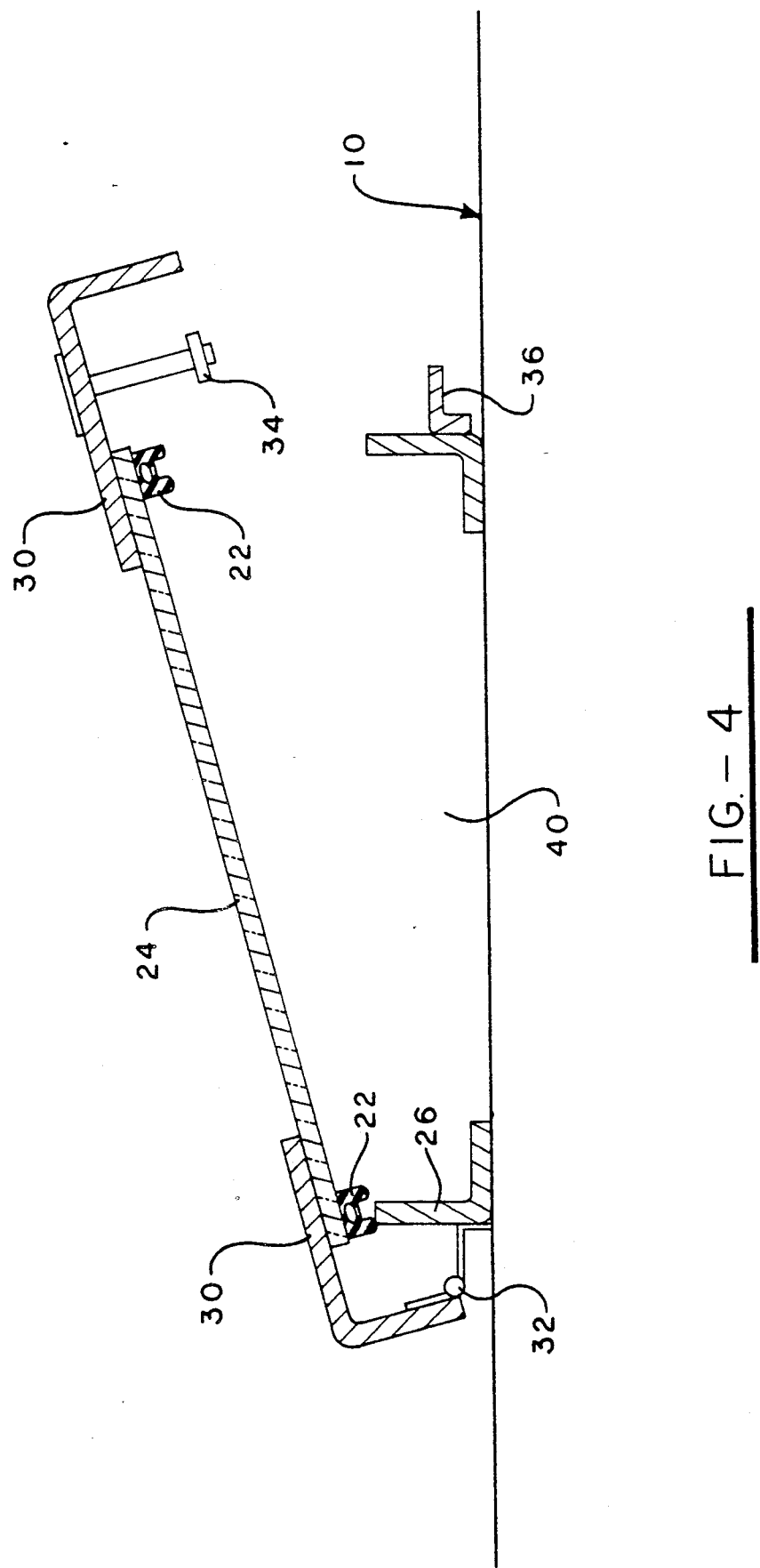
FIG. 4 is a cross-sectional view, similar to that shown in FIG. 3, and disclosing an alternative embodiment in which the compliant gasket is permanently secured to the transparent panel.

The outer most edge of the mounting frame 26 has a compliant gasket 22 attached as shown in FIG. 2. Alternatively, the compliant gasket 22 can be attached and sealed along the periphery of transparent panel 24 such that said gasket engages with said mounting frame whenever said transparent panel is in the closed position. The viewing door 30 is attached to the mounting frame 26 by a leaf hinge 32. A door latch 34 is attached to the viewing door 30 opposite the hinge 32. The door latch 34 operates in conjunction with a door latch bracket 36 attached to the mounting frame 26 to pull the viewing door 30 towards the mounting frame 26 compressing the compliant gasket 22. FIG. 3 shows the details of the hinge 32 and the latch 34. Typically the door latch 34 is adjusted to provide a minimum compression ranging from ⅛" to ⅜", but most preferably ¼ inches. This assures that the compliant gasket 22 completely seals the mounting frame 26 to the glass panel 24.

Prior art viewing windows typically mount and seal a glass panel to the viewing door. A second seal, usually a compliant gasket, is used to seal the viewing door to the mounting frame. In some applications, the compliant gasket seals against the control equipment enclosure surface.

These prior art viewing windows require two separate seals: the glass panel to the viewing door and the viewing door to the mounting frame. The present invention eliminates one seal by sealing the glass panel 24 directly to the mounting frame 26. No seal is required between the glass panel 24 and the viewing door 30. Any water, rain or dust leakage between the glass panel 24 and the viewing door 30 is outside the enclosed area 40 and not of concern.

A gasket to glass seal provides a better seal than a gasket to coated metal seal. Typically, the viewing windows and the mounting frames are manufactured from coated metal. The surface of commercial grade glass is smoother and flatter than commercial grade coated metal. The smoothness and flatness of the glass 24 will uniformly meet and compress the compliant gasket 22. This assures complete sealing on all four sides of the mounting frame 26 without having to over-compress the compliant gasket 22. Over-compressing the gasket 22 can cause early failure of the gasket due to fatigue. Over-compressing can also cause distortion of the viewing door which can cause seal leakage.

The preferred embodiment of the present invention uses transparent glass for the glass panel 24. For applications where viewing of the controls 12 and indicators 12' is not needed but protection of the controls 12 and indicators 12' is needed, partially transparent material, such as smoked acrylic or even opaque material can be used in place of the glass panel 24.

The preferred embodiment of the access window enclosure 20 is designed to be mounted on the front surface of a control equipment enclosure 10. The access window enclosure 20 can be installed in place of the front surface of a control equipment enclosure 10 or over an opening cut in the front surface of a control equipment enclosure 10. The hinge 32 and the door latch 34 can be mounted directly to the glass panel 24 and the metal frame of the viewing door eliminated.

I claim:

1. An access enclosure for use on a control equipment enclosure wherein said access enclosure provides protection for the controls and indicators located within the access enclosure comprising:
   a) a mounting frame for attachment to a surface of a control equipment enclosure, said mounting frame essentially circumscribing controls and/or indicators to be protected and defining an enclosure area;
   b) a door frame dimensioned slightly larger than said enclosure area and containing a transparent panel for closing off said enclosure area, said transparent panel being located in the essentially central portion of said door frame, and said door frame being connected to said mounting frame by a hinge means;
   c) a means for sealing said enclosure area consisting essentially of a compliant gasket for engaging exclusively between said mounting frame and peripheral portions of said transparent panel so as to seal said enclosure area containing controls and/or indicators from external elements when said transparent panel is in a closed position; and
   d) a cooperable latch means on said mounting frame and said door frame for securing said transparent panel in a closed position.

2. An access enclosure as in claim 1 wherein said latch means is adjusted to compress said compliant gasket to seal said transparent panel and said mounting frame when in a closed position.

3. An access enclosure as in claim 1 wherein said latch means is adjusted to compress said compliant gasket from $\frac{1}{8}$ inches to $\frac{3}{8}$ inches when in a closed position.

4. An access enclosure as in claim 1 wherein said mounting frame comprises a horizontal portion parallel to said surface of the control equipment enclosure and a vertical portion extending outward from said surface and having said compliant gasket attached to said vertical portion of said mounting frame.

5. An access enclosure as in claim 1 wherein said compliant gasket is attached to the peripheral portions of said transparent panel whereby said compliant gasket engages with said mounting frame whenever said transparent panel is in the closed position.

6. An access enclosure for use on a control equipment enclosure wherein said access enclosure provides protection for the controls and indicators located within the access enclosure comprising:
   a) a mounting frame for attachment to a surface of a control equipment enclosure, said mounting frame essentially circumscribing controls and/or indicators to be protected and defining an enclosure area;
   b) a transparent panel for closing off the enclosure area bounded by said mounting frame wherein said transparent panel is connected to said mounting frame by a hinge means;
   c) a means for sealing said enclosure area consisting essentially of a compliant gasket for engaging exclusively between said mounting frame and peripheral portions of said transparent panel so as to seal said enclosure area, containing controls and indicators, from external elements when said transparent panel is in the closed position; and
   d) a cooperable latch means on said mounting frame and said transparent panel for securing said transparent panel in a closed position.

7. An access enclosure as in claim 6 wherein said latch means is adjusted to compress said compliant gasket to seal said transparent panel and said mounting frame when in a closed position.

8. An access enclosure as in claim 6 wherein said latch means is adjusted to compress said compliant gasket from $\frac{1}{8}$ inches to $\frac{3}{8}$ inches when in a closed position.

9. An access enclosure as in claim 6 wherein said mounting frame comprises a horizontal portion parallel to said surface of the control equipment enclosure and a vertical portion extending outward from said surface and having said compliant gasket attached to said vertical portion of said mounting frame.

10. An access enclosure as in claim 6 wherein said compliant gasket is attached to the peripheral portions of said transparent panel whereby said compliant gasket engages with said mounting frame whenever said transparent panel is in the closed position.

* * * * *